US007196912B2

(12) United States Patent
Ohta et al.

(10) Patent No.: US 7,196,912 B2
(45) Date of Patent: Mar. 27, 2007

(54) LIGHTING APPARATUS FOR DISCHARGE LAMP

(75) Inventors: Shinji Ohta, Shizuoka (JP); Tomoyuki Ichikawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 11/223,538

(22) Filed: Sep. 9, 2005

(65) Prior Publication Data

US 2006/0055346 A1 Mar. 16, 2006

(30) Foreign Application Priority Data

Sep. 10, 2004 (JP) .......................... P.2004-264032

(51) Int. Cl.
*H02M 3/335* (2006.01)

(52) U.S. Cl. .............................. 363/21.03; 363/21.04; 363/21.2; 323/235; 323/238

(58) Field of Classification Search ..................... None
See application file for complete search history.

(56) References Cited

U.S. PATENT DOCUMENTS 6,826,063 B2 * 11/2004 Ichikawa et al. ............. 363/41
2004/0246750 A1 * 12/2004 Ichikawa et al. ........ 363/21.12

FOREIGN PATENT DOCUMENTS

JP 10-321388 12/1998

* cited by examiner

*Primary Examiner*—Tuyet Thi Vo
(74) *Attorney, Agent, or Firm*—Fish & Richardson P.C.

(57) ABSTRACT

In a lighting apparatus for a discharge lamp, a mask signal against a re-arc voltage is correctly generated to detect a lamp voltage accurately in view of a support to high frequency lighting such that the detection of the lamp voltage is not affected by the re-arc voltage. The lighting apparatus for the discharge lamp comprises a DC-AC converter for receiving an input voltage from a DC power supply to convert the input voltage to an AC voltage; detecting means for detecting a lamp voltage associated with a discharge lamp or a lamp voltage and a lamp current; and a signal generator circuit for generating a mask signal for excluding a re-arc voltage, which occurs at the time the polarity is inverted, from items to be detected, in the event of a detection of the lamp voltage. The signal generator circuit detects the lamp voltage or lamp current or a voltage at an output stage of the DC-AC converter to correctly capture a polarity inversion timing to generate a mask signal against the re-arc voltage. A timing shift of the mask signal can be limited within an allowable range even if the discharge lamp is lit at a high frequency.

4 Claims, 8 Drawing Sheets

LIGHTING APPARATUS FOR DISCHARGE LAMP

TECHNICAL FIELD

The disclosure relates to techniques for accurately detecting a lamp voltage in a discharge lamp lighting apparatus of an AC lighting type which uses a DC-AC converter.

BACKGROUND

Known methods of lighting a discharge lamp include a square-wave lighting method and a sinusoidal-wave lighting method, where it is necessary to detect the state of the discharge lamp, particularly, a lamp voltage to control properly power to be applied to the discharge lamp, and to determine correctly an error and the like-based on a detection signal indicative of a detected lamp voltage.

To prevent a re-arc voltage which occurs upon inversion of the polarity of a voltage across a discharge lamp from directly affecting the result of a detected lamp voltage, a period in which the re-arc voltage occurs may be excluded from a detection period.

For example, a method of masking a re-arc voltage may involve generating a timing signal in such a manner that no sampling is performed during a period in which the re-arc voltage can occur in a sample/hold circuit. In other words, a lamp voltage is sampled and held only during a period in which the re-arc voltage is absent, and is presented as the detection result.

For this purpose, it is necessary to identify a time at which the lamp voltage is not sampled, based on some signal, i.e., a signal for masking the re-arc voltage. In regard to AC lighting of a discharge lamp, semiconductor switching elements are employed in a DC-AC converter and the like, with the ability to control on/off operations of the switching elements, so that it is possible to detect a level change switching timing (H→L or L→H) associated with a driving signal for the element, or to detect the time from a signal which is the basis of the driving signal (output signal of an oscillator circuit or the like) to generate a mask signal (signal for masking) for the re-arc voltage.

Some conventional circuit configurations have a problem in that no specific and effective actions are taken for masking the re-arc voltage without fail upon detection of the lamp voltage in the high frequency AC lighting.

In a lighting circuit for a discharge lamp, a driving signal from a control circuit is supplied to the switching elements for controlling the switching of these elements, or depending on the circuit configuration, a voltage is supplied to a discharge lamp through a resonator circuit, a transformer and the like, where the voltage across the discharge lamp has its polarity inverted at a period corresponding to a switching frequency. Since the timing of inverting the polarity of the voltage across the discharge lamp is delayed from a change in the driving signal to the switching elements at all times, a mask signal for the re-arc voltage should be generated in view of this delay.

A shift in timing due to such a delay can be readily adjusted within a low lighting frequency range such as several hundreds kilohertz, but the situation becomes more serious as the lighting frequency increases. Specifically, as the switching element driving frequency increases, a larger shift in relative timing occurs between the time at which the driving signal changes and the time at which the polarity is inverted, thus causing difficulties in correctly fitting the mask signal generated based on the change in the driving signal to a period in which the re-arc voltage occurs. As a result, the lamp voltage cannot be correctly detected (a larger timing shift causes an adverse influence due to the detection of the re-arc voltage to exert on the detected lamp voltage), possibly hampering the power control of the discharge lamp, and the like.

It is, therefore, desirable to generate correctly a mask signal for a re-arc voltage in view of a support to high frequency lighting in a lighting apparatus for a discharge lamp such that the re-arc voltage will not affect the detection of a lamp voltage, thus accurately detecting the lamp voltage.

SUMMARY

In one aspect, the invention provides a lighting apparatus for a discharge lamp which comprises a DC-AC converter for receiving an input voltage from a DC power supply to convert the input voltage to an AC voltage; detecting means for detecting a lamp voltage associated with a discharge lamp or a lamp voltage and a lamp current of the discharge lamp; and a signal generator circuit for generating a mask signal for excluding a re-arc voltage which occurs at the time the polarity is inverted from items to be detected, in the event of a detection of the lamp voltage, wherein the signal generator circuit detects the lamp voltage or lamp current or a voltage at an output stage of the DC-AC converter to detect a polarity inversion timing to generate the mask signal against the re-arc voltage.

Even if a discharge lamp is lit at a high frequency, the time at which a re-arc voltage occurs can be captured correctly at the time the voltage polarity is inverted, to minimize a timing shift of the mask signal within an allowable range.

According to the disclosed techniques, the lamp voltage can be correctly detected without being affected by the re-arc voltage, thereby making it possible to improve the lighting controllability and the certitude of a circuit protection and the like.

According to a particular configuration which comprises a differentiator circuit to detect a polarity inversion timing, the detection is relatively easy, and the circuit configuration is not complicated.

Another configuration comprises a comparator circuit for comparing a signal level with a predefined reference value and a delay circuit subsequent thereto to detect a polarity inversion timing based on the result of the comparison. A masking time can be set corresponding to a time for which a re-arc voltage occurs based on the result of the detection of the level of the lamp voltage, lamp current or the like.

In some configurations, a detected value of the lamp current is zero, or equal to or lower than the reference value, while a re-arc voltage is occurring to generate the mask signal. The configuration then obtains a detection result of the lamp voltage by a logical AND operation of the mask signal with a detected signal of the lamp voltage. A re-arc voltage occurrence period can be determined based on the lamp current.

The lighting apparatus for a discharge lamp which comprises the DC-AC converter, when applied to a lamp voltage detector circuit associated with a discharge lamp, is effective in lighting control based on correct detection results, measures to circuit protection, and the like.

Other features and advantages may be readily apparent from the following detailed description, the accompanying drawings and the claims.

DETAILED DESCRIPTION

The disclosure relates to masking a re-arc voltage without fail in view of a support to high frequency lighting in a lighting apparatus for a discharge lamp using a DC-AC converter. Specifically, the re-arc voltage which occurs when a voltage across the discharge lamp is inverted in polarity is excluded from items to be detected to minimize a temporal shift and a phase shift between a mask signal and a period in which the re-arc voltage occurs such that the detection of the lamp voltage is not affected by the re-arc voltage.

Figure 1:
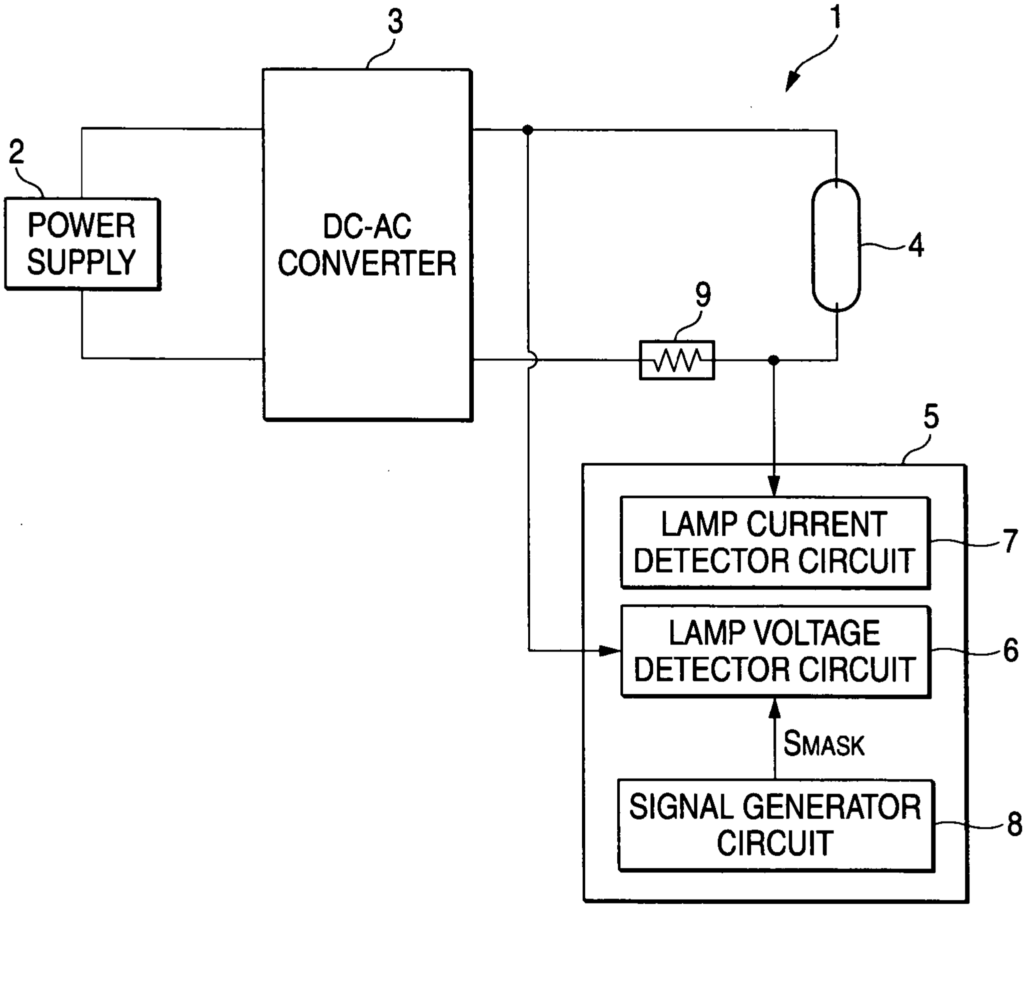
[FIG. 1] A diagram illustrating an example of a basic configuration according to the invention.

FIG. 1 is a diagram illustrating an example of a configuration of a lighting apparatus for a discharge lamp according to the invention.

A lighting apparatus 1 for a discharge lamp comprises a DC-AC converter 3 which receives a DC input voltage from a DC power supply 2 to convert the DC voltage to an AC voltage which is supplied to a discharge lamp 4. Though not shown, the lighting apparatus comprises a starter circuit (also known as an igniter) for generating a starting signal to the discharge lamp, a variety of protection circuits, and the like.

A detecting means 5 is provided for detecting a lamp voltage and a lamp current associated with the discharge lamp, and its detection signal is sent to a control circuit, a lighting/extinction determination circuit, error determination circuit and the like, not shown, for use in power control of the discharge lamp, circuit protection, and the like.

The detecting means 5 comprises a lamp voltage detector circuit 6, a lamp current detector circuit 7, and a signal generator circuit 8.

The lamp voltage detector circuit 6 detects a voltage across the discharge lamp 4 after a period in which a re-arc voltage is occurring is excluded from the detection based on a timing provided by a mask signal (hereinafter labeled "Smask") from the signal generator circuit 8, and generates a finally detected voltage signal (hereinafter labeled "VL"). Upon detection of the lamp voltage, the signal generator circuit 8 generates the mask signal for excluding the re-arc voltage, which occurs upon inversion in polarity, from items to be detected.

In order to detect a current flowing through the discharge lamp 4, the lamp current detector circuit 7 processes a signal converted to a voltage, for example, using a detecting element 9 such as a current detecting resistor or the like to detect a current signal (hereinafter labeled "IL").

Figure 2:
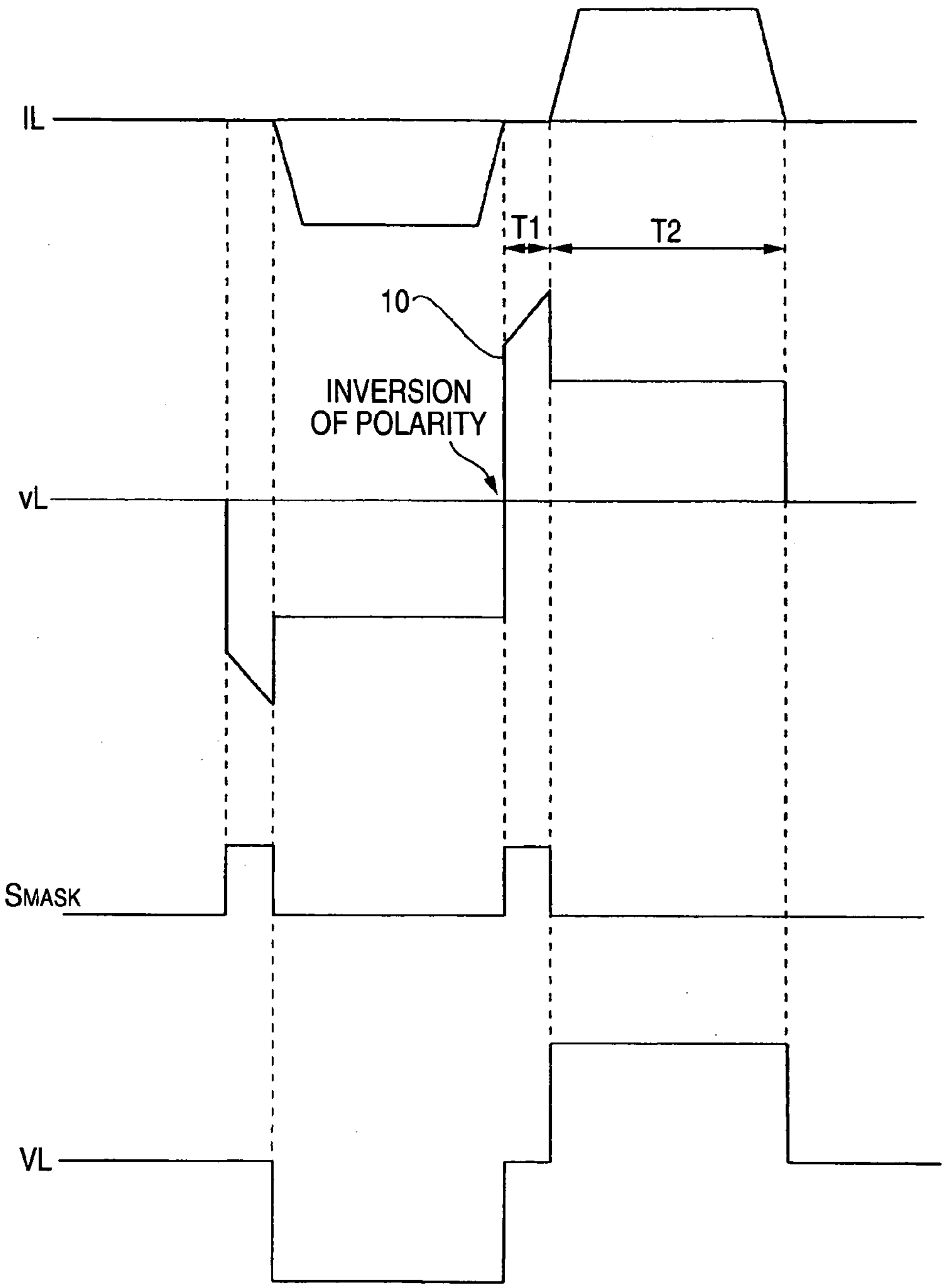
[FIG. 2] An explanatory diagram generally illustrating waveforms in various locations in square wave lighting.

FIG. 2 is a waveform chart generally representing IL, vL (lamp voltage), Smask, VL, giving a square-wave lighting as an example.

A period "T1" shown in FIG. 2 indicates a period in which the re-arc voltage is occurring (drawn with an emphasized width), while a period "T2" indicates a period except for T1 within one cyclic period.

In the period T1, IL substantially indicates zero, an abrupt pulse waveform 10 appears in vL, and the mask signal Smask is generated such that vL is not detected as it is.

In the detected signal VL, a lamp voltage is detected in T2 except for the duration of the mask signal Smask.

As described above, a higher lighting frequency of the discharge lamp causes a larger relative shift between a change in the driving signal to switching elements which make up the DC-AC converter 3 and the time at which the voltage across the discharge lamp is inverted in polarity, resulting in difficulties in fitting the mask signal to the period in which the re-arc voltage is occurring.

The signal generator circuit 8 detects the time at which the voltage across the discharge lamp is inverted in polarity to generate a mask signal for the re-arc voltage in the following manner.

(I) The signal generator circuit 8 detects the lamp voltage or lamp current to detect the timing of the polarity inversion from a temporal change or a level change in the detected voltage or current.

(II) The signal generator circuit 8 detects a voltage at an output stage of the DC-AC converter to detect the timing of the polarity inversion from a temporal change or a level change in the detected voltage.

In (I), by generating the mask signal for the re-arc voltage utilizing the detected voltage as it is associated with the lamp voltage or lamp current, the mask signal can be accurately and reliably fitted in timing and width to the period in which the re-arc voltage is occurring.

In (II), on the other hand, by generating the mask signal for the re-arc voltage utilizing the voltage at the output stage of the DC-AC converter circuit 3, a shift in the timing of the mask signal can be minimized with respect to the period in which the re-arc voltage is occurring. As is described in detail below, the voltage output by the DC-AC converter 3 may be, for example, a middle-point voltage of a half-bridge type circuit or a full-bridge type circuit, a voltage of a resonator circuit, or the like.

Figure 3:
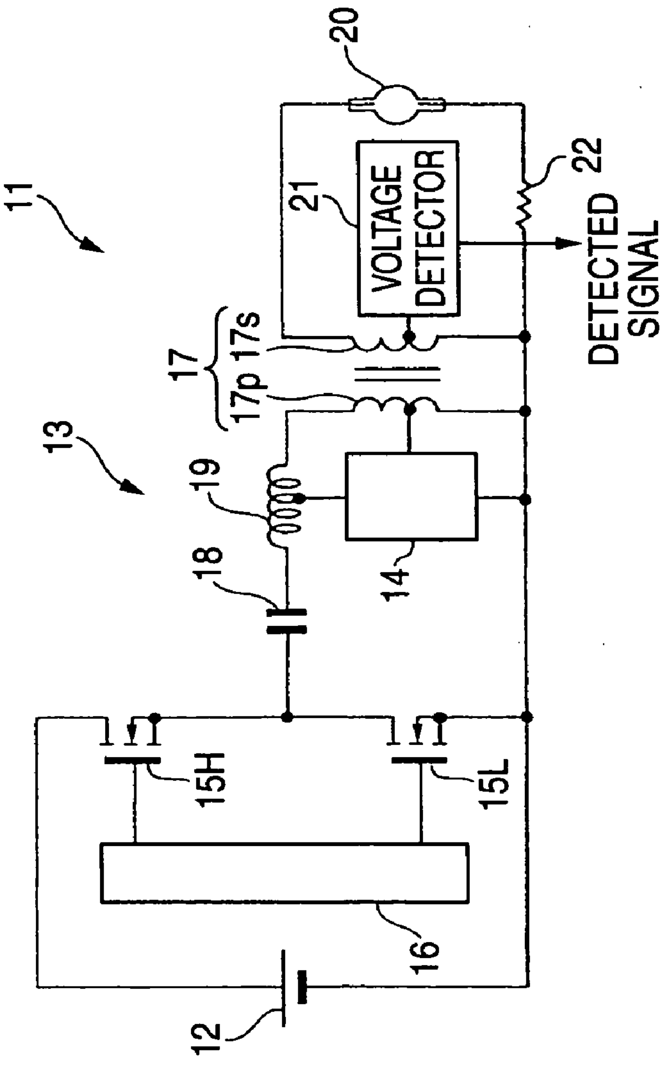
[FIG. 3] A diagram illustrating an example of a configuration of a lighting apparatus for a discharge lamp.

FIG. 3 illustrates a main portion of an example of a configuration 11 of the lighting apparatus for a discharge lamp, which comprises a DC-AC converter 13 that receives power supplied from a DC power supply 12, and a starter circuit 14.

The DC-AC converter circuit 13 receives a DC input voltage from the DC power supply 13 to convert the DC input voltage to an AC voltage and boosts the AC voltage. In this example, the DC-AC converter 13 is in a half-bridge type configuration, and comprises switching elements 15H, 15L (FETs are used in this example), and a gate driver 16 for controlling and driving the switching elements 15H, 15L. The upper element 15H has one end connected to a positive terminal of the DC power supply 12, and the other end grounded through the lower element 15L. The elements 15H, 15L are alternately controlled for switching with intervention of a predetermined pause.

In this example, the DC-AC converter 13 comprises a power transformer 17, and utilizes a resonance phenomenon of a resonance capacitor arranged on the primary side of the transformer 17 with an inductor 19. In other words, a median point of the half bridge is connected to one end of a primary winding 17$p$ of the transformer 17 through the resonance capacitor 18 and inductor 19.

The starter circuit 14 supplies the discharge lamp 20 with a starting signal, where an output voltage upon starting is boosted by the transformer 17 and applied to the discharge lamp 20 (the starting signal is multiplexed on an AC converted output, and the resulting multiplexed signal is supplied to the discharge lamp 20).

A voltage detector 21 disposed on the secondary side of the transformer 17 detects a lamp voltage across the discharge lamp 20. The voltage detector 21 has an input terminal connected to a midpoint of the secondary winding 17$s$ of the transformer 17, and sends a detected signal to a controller, a protection circuit and the like, not shown. In some implementations, a winding dedicated for detection may be provided instead.

A resistor 22 for detecting a lamp current is disposed in series with the discharge lamp 20. The resistor 22 is connected to a connection point of the primary winding 17$p$ and the secondary winding 17$s$ of the transformer 17. A signal converted to a voltage by the resistor 22 for detection is sent to a lamp current detector (not shown).

In this example, in controlling the lighting of the discharge lamp, a primary current of the transformer 17 is controlled to control a secondary current of the transformer taking advantage of the fact that the impedance characteristic of the series resonance circuit depends on the switching frequency of the DC-AC converter 13. For example, a switching control is conducted at a frequency higher than the resonance frequency determined by the static capacitance of the capacitor, inductor 19, and inductance, and the lamp current or power applied to the discharge lamp is controlled by varying a driving frequency for the switching elements in the DC-AC converter 13.

Figure 4:
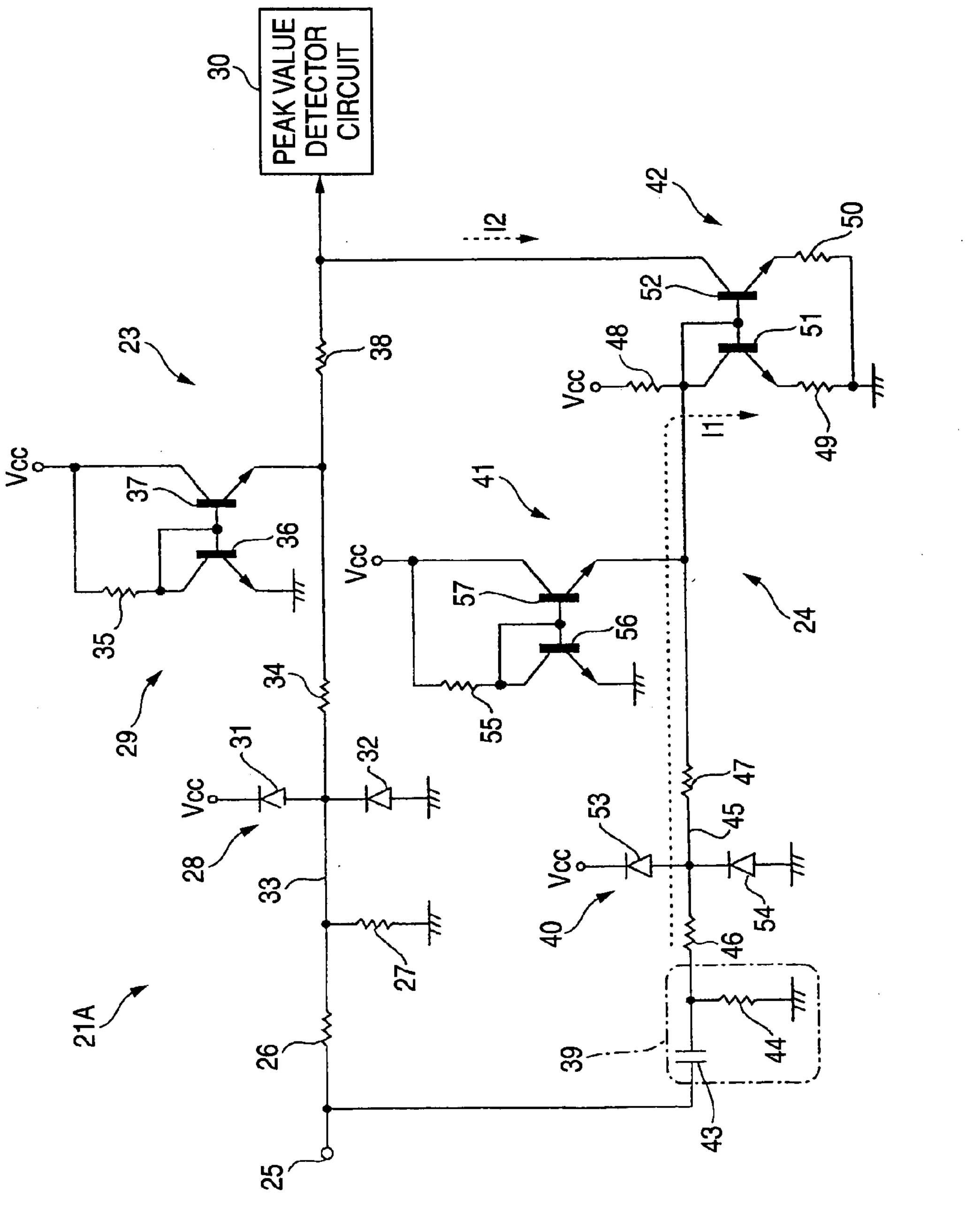
[FIG. 4] A diagram illustrating an example of a configuration of a voltage detector according to the invention.

FIG. 4 illustrates an example of a configuration 21A in the aforementioned form (I), which comprises the detector 23 and a masking unit 24.

In the following paragraphs, the detector 23 is described. A voltage at a midpoint of the secondary winding 17$s$ of the transformer is drawn to a detection terminal 25 of the detector 23, and is branched into two parts. One is divided by resistors 26, 27 to be limited within a voltage range in which a peak can be detected, and is sent to a subsequent peak value detector circuit 30 through limiter circuits 28, 29.

The limiter circuit 28 prevents the peak value detector circuit 30 from being applied with a voltage exceeding the supply voltage (Vcc) or a voltage below the ground level, and is composed of two diodes (or two NPN transistors in diode-connected configuration) 31, 32 which are connected to each other at a point which is connected to a resistor 34 on a line 33. In the diodes 31, 32 connected in series, the diode 31 has a cathode connected to the power supply terminal at Vcc, so that each diode is oriented forward toward this power supply terminal.

The limiter circuit 29, in turn, prevents the peak voltage detector circuit 30 from being applied with a negative voltage, and is composed of a resistor 35 and two NPN transistors 36, 37. The transistor 37 has an emitter connected between the resistors 34 and 38, and also connected to the peak value detector circuit 30 through the resistor 38. The resistor 35 has one end connected to the power supply terminal at Vcc, and the other end connected to a collector and a base of the transistor 36. The transistor 37 has a collector connected to the power supply terminal at Vcc, and a base connected to the base of the transistor 36.

The masking unit 24 comprises a differentiator circuit 39, limiter circuits 40, 41, and a current mirror circuit 42.

A line branched from the detection terminal 25 is coupled to the differentiator circuit 39 which employs a capacitor 43 and a resistor 44, and sends the output to the current mirror circuit 42 through resistors 46, 47 on a line 45.

The current mirror circuit 42 is composed of resistors 48–50, and NPN transistors 51, 52.

The resistor 48 has its one end connected to the power supply terminal at Vcc, and the other end connected to a collector and a base of the transistor 51.

The transistor has its base connected to a base of the transistor 52, and its emitter grounded through the resistor 49.

The transistor 52 has its collector connected between the resistor 48 and an input terminal of the peak value detector circuit 30, and its emitter grounded through the resistor 50.

The limiter circuit 40 comprises diodes 53, 54 (or two NPN transistors in diode connected configuration) in a manner similar to the limiter circuit 28, and a connection point of both is connected between the resistors 46 and 47 on the line 45.

The limiter circuit 41 in turn comprises a resistor 55 and NPN transistors 56, 57 in a manner similar to the limiter circuit 29.

In this example, the masking unit 24 acts to increase a reference current of the current mirror circuit 42 upon generation of a re-arc voltage using the CR-based differentiator circuit 39, to pull down a voltage detected by the detector 23. More specifically, as indicted by the broken-line arrow "I1" in FIG. 4, a collector current of the transistor 51 increases during a period in which the re-arc voltage occurs, accompanied by an increase in a collector current of the transistor 52, as indicated by the broken-line arrow "I2" in FIG. 4, thereby masking the re-arc voltage. Both transistors are not saturated so that they are turned off more rapidly. Also, a trace of current too small to produce an error in a detected voltage is applied at all times by a setting of the resistor 48 for faster operations to avoid a delay in turn-on timing upon occurrence of a re-arc voltage.

The peak value detector circuit 30 comprises, for example, an operational amplifier, a transistor which operates in response to an output signal of the operational amplifier, a holding capacitor, and a discharge resistor connected in parallel with the capacitor. The capacitor and discharge resistor form an RC filter which has a cut-off frequency set at a frequency required for a calculation related to power applied to the discharge lamp.

In this circuit, when a relatively high re-arc voltage occurs, a polarity inversion timing can be readily detected through differentiation-based detection, but a low re-arc voltage causes a small current to flow into the transistors 51, 52, so that the masking unit 24 is preferably designed such that a lamp voltage is detected to be slightly higher.

Next, a description is provided about how a polarity inversion timing is detected based on the result of a comparison made by a comparing means included in the signal generator circuit for comparing a signal level with a predefined reference value.

In the detection of the lamp voltage, a mask signal can be generated by acquiring a polarity inversion timing through detection of zero-cross.

Figure 5:
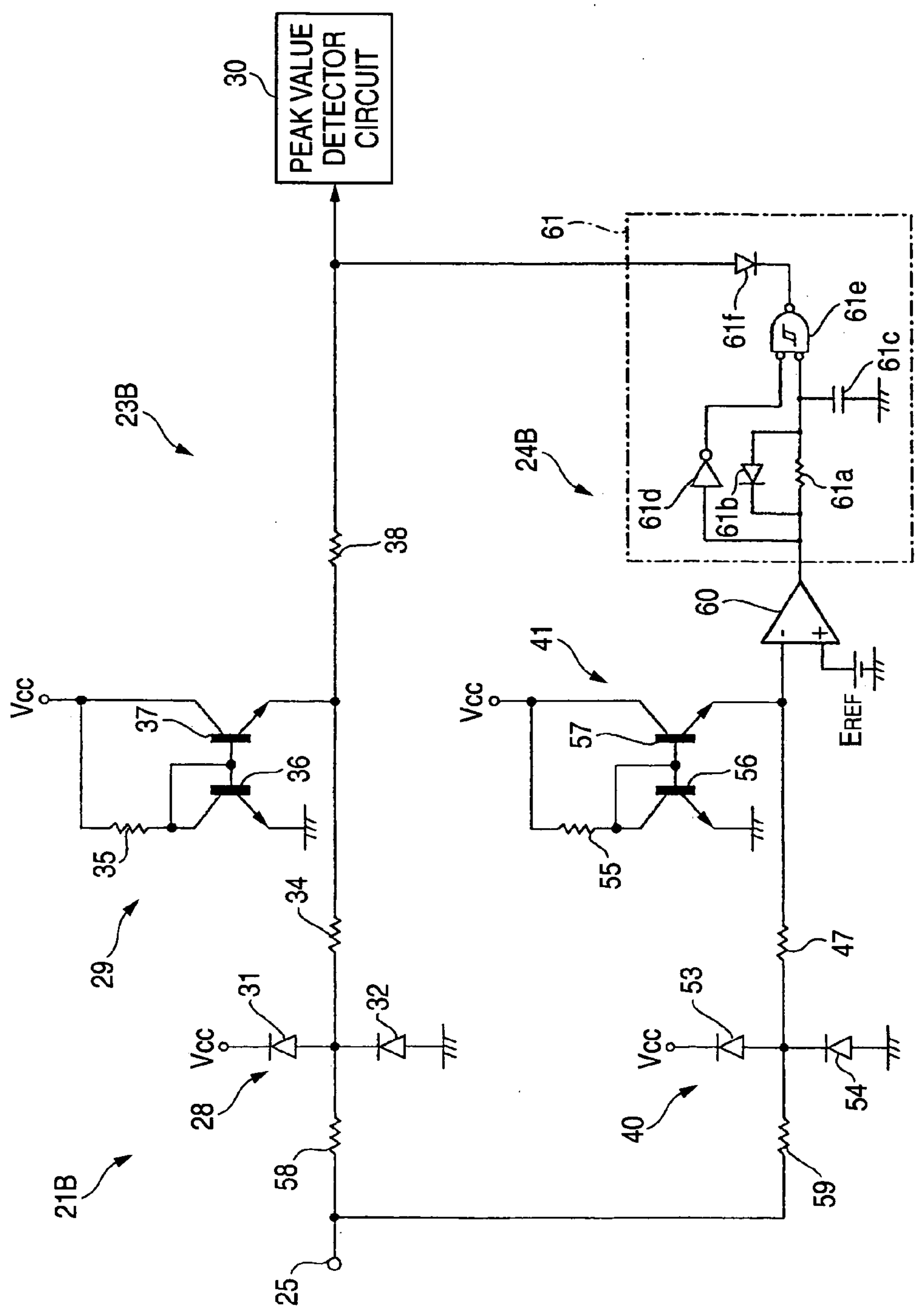
[FIG. 5] A diagram illustrating another example of a configuration of the voltage detector according to the invention.

FIG. 5 illustrates such an exemplary configuration 21B which comprises a detector 23B and a masking unit 24B.

The configuration 21B differs from the configuration 21A in the following aspects.

The detector 23B extracts a voltage from the detection terminal 25, and branches the voltage into two parts, one of which is sent to the peak value detector circuit 30 through resistors 58, 34, 38 on the branched line.

The masking unit 24B comprises a comparator 60 and a delay circuit 61, and a voltage from the detection terminal 25 is sent to the comparator 60 through resistors 59, 47.

Each of the limiter circuits 28, 29, 40, 41 is similar in configuration and function to the foregoing.

The comparator 60, which comprises a comparing means, has one negative input terminal connected to the detection terminal 25 through the resistors 47, 59, and the other positive input terminal supplied with a reference voltage "Eref" which is represented by a symbol of a regulated voltage source in FIG. 5. The resistors 58, 59 have the same resistance value, and the resistors 34, 47 have the same resistance value.

The comparator 60 delivers an output at L (low) level during a period in which a re-arc voltage occurs, and presents HZ (high impedance) at the output other than that period. It should be noted that a fast comparator should be used to support high frequency lighting.

The subsequent delay circuit 61 is responsive to the L-level signal delivered from the comparator circuit 60 to delay a signal by the period in which the re-arc voltage is occurring to generate a predetermined mask signal. The delay circuit 61 has an output terminal connected between the resistor 38 of the detector 23B and the peak value detector circuit 30, so that a detected voltage is pulled down to L-level during the period in which the re-arc voltage is occurring.

The delay circuit 61 may comprise, for example, an integrator circuit for the output signal of the comparator 60 to generate a delay signal through a negative-logic logical AND operation.

As illustrated, the delay circuit 61 comprises a resistor 61*a*, a diode 61*b*, a capacitor 61*c*, a NOT gate 61*d*, an L-active two-input, one-output Schmitt trigger type AND gate 61*e*, and a diode 61*f*. Specifically, the output signal of the comparator 60 is supplied to one input terminal of the AND gate 61*e* through the resistor 61*a* and capacitor 61*c*, and the output signal of the comparator 60 is supplied to the other input terminal of the AND gate 61*e* through the NOT gate 61*d*. The diode 61*b* is connected in parallel with the resistor 61*a*, to define a forward direction from the AND gate 61*e* to comparator 60. Also, the capacitor 61*c* has one end connected to one input terminal of the AND gate 61*e*, and the other end grounded.

The AND gate 61*e* has an output terminal connected to a cathode of the diode 61*f*, which has an anode connected between the resistor 38 and peak value detector circuit 30.

The technique is not limited to the detection of voltage. FIG. 3 illustrates an implementation for detecting a lamp current using the resistor (shunt resistor) 22 for detecting a current. In that example, the current value is small (IL≈0) during a period in which a re-arc voltage is occurring (see the period T1 in IL in FIG. 2), so that the distinction from the lamp current is easy during the other period (T2). Therefore, when the mask signal is generated as the detected IL value falls to a predefined reference value or lower, a detected voltage is excluded in the period in which a re-arc voltage is occurring, as is the case with the foregoing. In other words, the comparator 60 is applied with the detected IL signal-for comparison with the reference voltage, and delivers an L-level signal when a re-arc voltage is generated, causing a detected voltage to be pulled down through the delay circuit 61.

Figure 6:
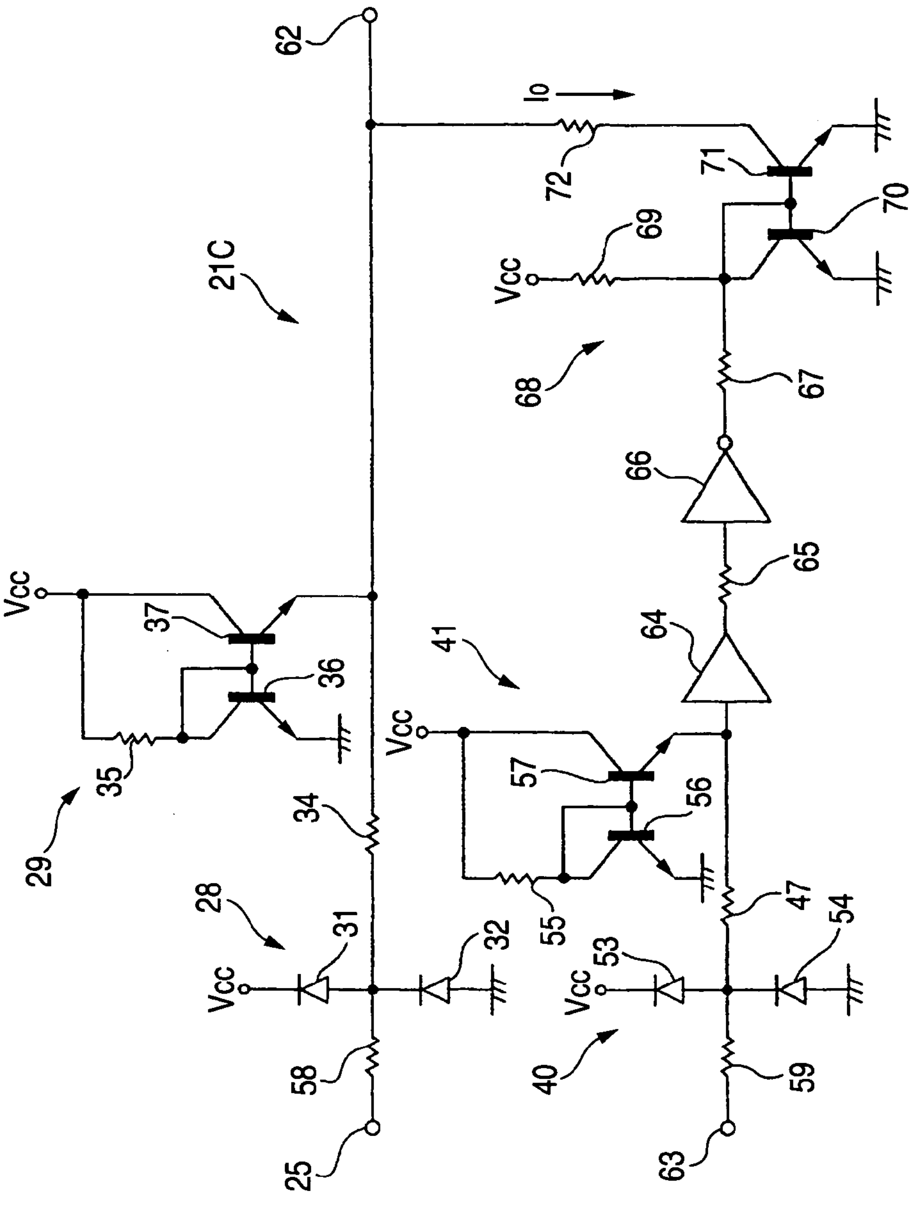
[FIG. 6] A diagram illustrating a further example of a configuration of the voltage detector according to the invention.

A manner of detection taking advantage of the fact that a smaller lamp current is detected during the occurrence of a re-arc voltage may be represented, for example, by an example configuration 21C illustrated in FIG. 6.

The lamp voltage detection terminal 25 is connected to a detection output terminal 62 through the resistor 58 and limiter circuits 28, 29, and a detected signal which has been masked against a re-arc voltage is sent to a peak value detector circuit (not shown).

A lamp current detection terminal 63 is coupled to a current mirror circuit 68 through the resistor 59, limiter circuits 40, 41, amplifier 64, resistor 65, NOT (logical not) gate 66, and resistor 67.

In the current mirror circuit 68, an emitter-grounded NPN transistor 70 has its collector connected to the power supply terminal through the resistor 69, and also connected to the resistor 67 and to bases of the transistors 70, 71. Also, the emitter-grounded transistor 71 has a collector connected to the detection output terminal 62 through a resistor 72.

During a period in which a re-arc voltage is occurring, the lamp current is substantially zero, causing the output of the NOT gate 66 to rise to H-level to pull up the base potentials of the transistors 70, 71 of the current mirror circuit 68, resulting in an increase in a collector current of the transistor 71 in a direction indicated by an arrow "Io" to mask the re-arc voltage.

In an implementation for detecting that the detected lamp current is zero or equal to or less than a reference value when a re-arc voltage is occurring, to generate the mask signal, a final detection result of the lamp voltage can be provided by a logical AND operation of the mask signal and a signal indicative of a detected lamp voltage.

In an implementation which utilizes the detection of the lamp current crossing zero, a zero-cross detection time is equal to a time for which the re-arc voltage should be masked, so that the width of the mask signal can be advantageously set with ease. However, since a small lamp current is detected, attention should be paid to a setting of a threshold for the detection.

Alternatively, a buffer circuit may be substituted for the NOT gate 66, and a diode may be substituted for the current mirror circuit 68, such that a cathode of the diode is connected to an output terminal of the buffer circuit to conduct the diode for a period in which a re-arc voltage is occurring, thereby generating a masked voltage detection signal. Other than the foregoing, a number of alternative implementations can be made.

Next, an exemplary configuration of the aforementioned form (II) will be described with reference to FIGS. 7 and 8.

Figure 7:
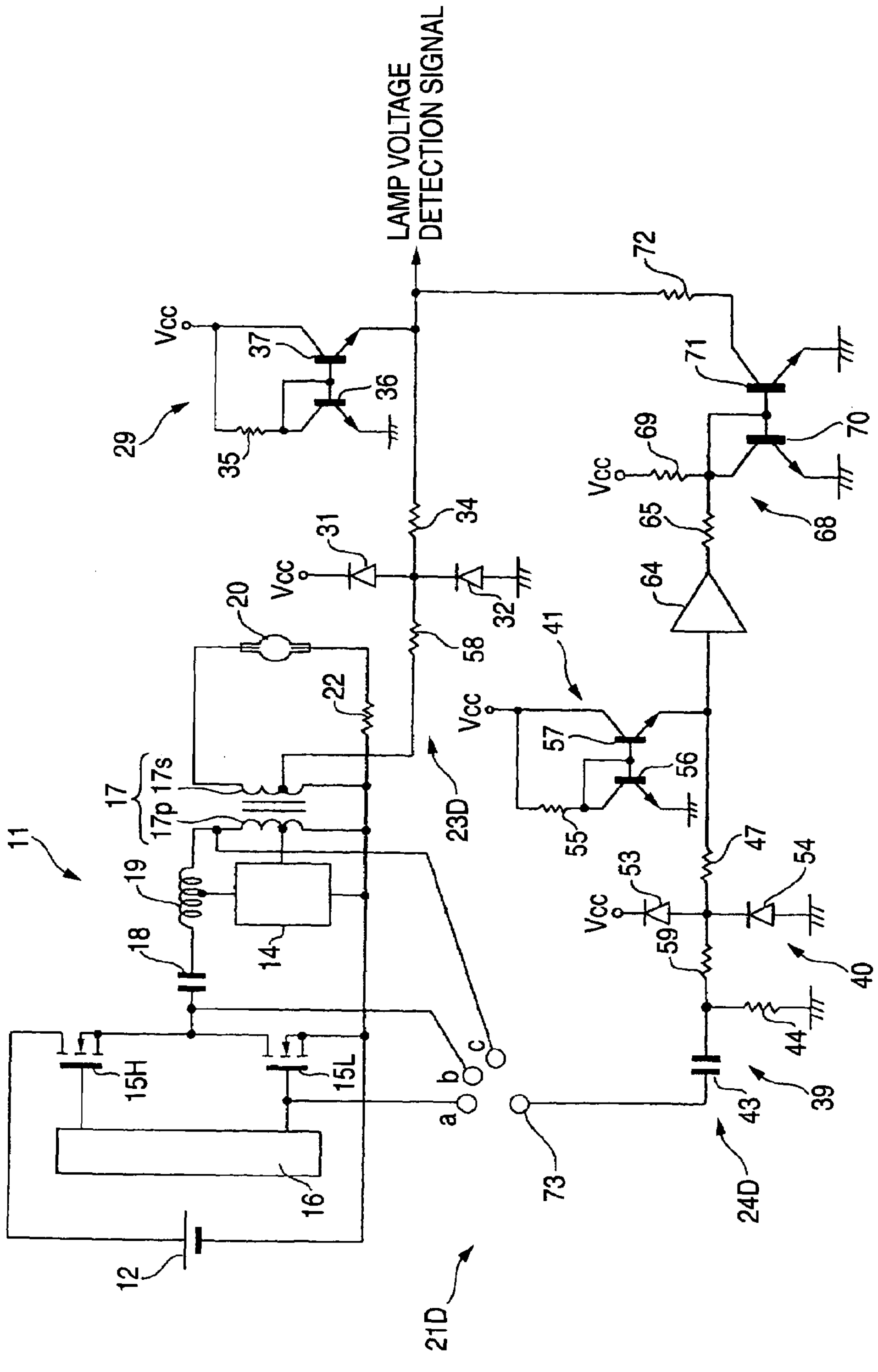
[FIG. 7] A diagram generally illustrating a variety of implementations in application to the configuration illustrated in FIG. 3.

FIG. 7 generally illustrates implementations shown below in the exemplary configuration in FIG. 3:

(A) an implementation for generating a mask signal utilizing a driving signal to the switching element 15L;

(B) an implementation for generating a mask signal utilizing a voltage at a middle point of a half bridge; and (C) an implementation for generating a mask signal utilizing a voltage on the primary side of the transformer 17.

In an exemplary circuit 21D, describing first a lamp voltage detector 23D, a voltage extracted from a midpoint of the secondary winding 17*s* of the transformer 17 is sent to a peak value detector circuit (not shown) through the resistor 58 and limiter circuits 28, 29.

In a masking unit 24D, a terminal 73 is connected to the differentiator circuit 39, so that a differentiated detection signal is sent to the current mirror circuit 68 through the resistor 59, limiter circuits 40, 41, buffer 64, or resistor 65 without the buffer 64.

Terminals a, b, c shown in FIG. 7 are merely for convenience of description. The terminal a is connected to the control terminal (gate) of the switching element 15L; the terminal b is connected to the middle point of the half bridge (connection point of the switching elements 15H and 15L); and the terminal c is connected to one end of the primary winding 17*p* of the transformer 17 (terminal near the inductor 19).

In the implementation (A), the terminal a is connected to the terminal 73, so that a change in the driving signal for the switching element 15L is differentiated and detected at the time the half bridge is switched. A current of the current mirror circuit 68 increases while a re-arc voltage is occurring to result in an increased collector current of the transistor 71, so that the re-arc voltage is masked in the detector 23D.

In the implementation (B), in turn, the terminal b is connected to the terminal 73, so that a voltage at the middle point is differentiated and detected at the time the half bridge is switched. A current of the current mirror circuit 68 increased while a re-arc voltage is occurring to result in an increased collector current of the transistor 71, so that the re-arc voltage is masked in the detector 23D.

In LC resonance, the output voltage of the half bridge matches the lamp voltage in phase, but both voltages do not always match in phase when the lighting of the discharge lamp is controlled in an out-of-resonance state. It is therefore preferable to employ a method which involves a temporal correction from the switching timing of the bridge, or to adjust the time constant (CR constant) of the differentiator circuit 39 such that the re-arc voltage can be masked over an entire frequency range which can be assumed when the discharge lamp is lit.

In the implementation (C), the terminal c is connected to the terminal 73, so that the voltage on the primary side of the transformer 17 is differentiated and detected. Since the voltage on the primary side matches the lamp voltage in phase, the aforementioned measures to a phase shift are not needed, or strict adjustments and the like are not required. Likewise, in this example, as the current of the current mirror 68 increases while a re-arc voltage is occurring, the collector current of the transistor 71 increases so that the re-arc voltage is masked in the detector 23D.

In the examples described above, the differentiator circuit 39 is employed in the masking unit. In other implementations, a comparator may be employed instead, as described above.

Alternatively, the output voltage of the DC-AC converter may be detected to control a control signal for sampling, and a sample/hold circuit may be used to detect the lamp voltage.

Figure 8:
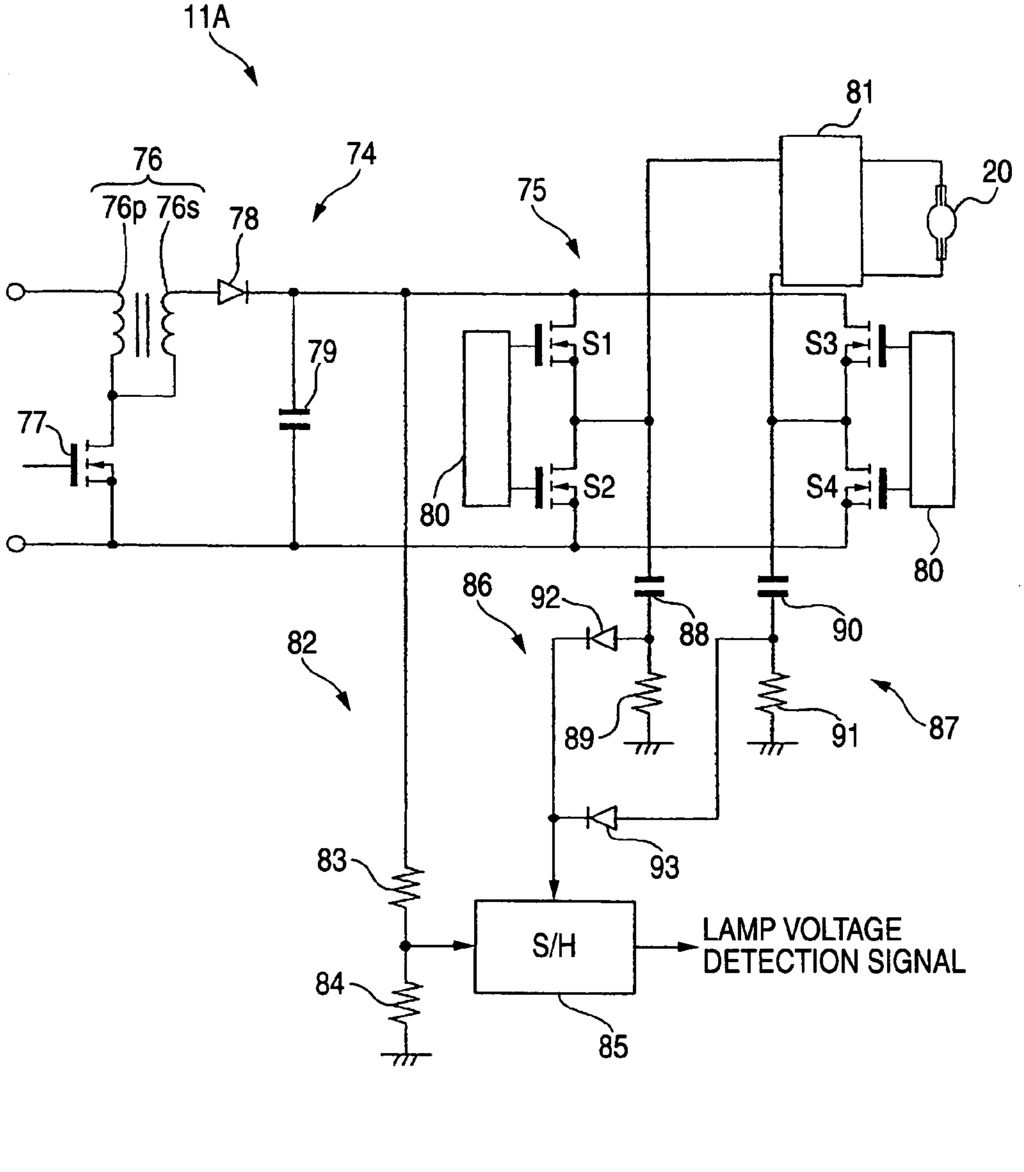
[FIG. 8] A diagram illustrating an example of a configuration when an output voltage of a DC-AC converter is detected to generate a control signal for sampling.

FIG. 8 illustrates an example of such a circuit configuration, showing how a sampling signal is generated utilizing a voltage at a middle point of a full bridge in a low-frequency square wave lighting method.

A discharge lamp lighting apparatus 11A comprises a DC-DC converter circuit 74, and a DC-AC converter circuit 75 subsequent thereto.

The DC-DC converter circuit 74 receives a DC input voltage from a DC power supply, not shown, to convert the DC input voltage to a desired DC voltage, and may be implemented, for example, by a fly-back DC-DC converter.

A transformer 76 has a primary winding 76*p* connected to a switching element 77. In this example, an N-channel FET is used for the switching element 77, and is switched in response to a signal from a control circuit (not shown).

A rectifying diode 78 and smoothing capacitor 79 are provided on the secondary side of the transformer 76. A secondary winding 76*s* has one end connected to a connection point of the primary winding 76*p* with the switching element 77, and the other end connected to an anode of the diode 78. The diode 78 has a cathode connected to one end of the capacitor 79, so that its terminal voltage is outputted to the DC-AC converter circuit 75.

The DC-AC converter circuit 75 is provided for supplying the output voltage of the DC-DC converter circuit 74 to a discharge lamp 20 after it has been converted to an AC voltage. For example, as illustrated, the DC-AC converter circuit 75 has a full-bridge type circuit configuration, wherein two arms are defined using four semiconductor switching elements S1–S4 (FETs in this example). The DC-AC converter circuit 75 comprises driving circuits 80 for separately driving the switching elements on the respective arms. An AC voltage is outputted by complementarily controlling on/off the two sets of switching-element pairs (S1 and S4, S2 and S3) based on a signal from a control circuit, not shown.

A starter circuit 81 is provided for generating a starting pulse to the discharge lamp 20 to start the discharge lamp. In other words, the starting pulse is multiplexed on the AC voltage outputted from the DC-AC converter circuit 75, and the resulting multiplexed signal is applied to the discharge lamp 20.

A voltage detector 82 comprises voltage dividing resistors 83, 84 for an output voltage of the DC-DC converter circuit 74, and a sample/hold circuit 85. The voltage detector 82 also comprises differentiator circuits 86, 87 for generating a control signal (sampling signal) to the sample/hold circuit 85.

Differentiator circuits 86, 87 are each composed of a capacitor and a resistor, where a capacitor 88, which forms part of one differentiator circuit 86, has one end connected to a connection point of the switching elements S1 and S2, and the other end grounded through a resistor 89. A capacitor 90, which forms part of the other differentiator circuit 87, has one end connected to a connection point of the switching elements S3 and S4, and the other end grounded through a resistor 91.

A detection signal generated by each differentiator circuit is sent to the sample/hold circuit 85 through an OR (logical OR) circuit using diodes 92, 93. Specifically, the diode 92 has an anode connected between the capacitor 88 and resistor 89, while the diode 93 has an anode connected between the capacitor 90 and resistor 91, and both diodes have their cathodes connected to each other and also connected to a control terminal of he sample/hold circuit 85.

Upon switching of the polarity of the bridge, the differentiator circuits 86, 87 send an H-level signal to the sample/hold circuit 85 through the diode-based OR circuit. In this way, the re-arc voltage is excluded from items to be detected, and an input signal is detected at a timing after a period in which a re-arc voltage has occurred (held by an H-level signal and sampled by an L-level signal).

A voltage signal produced by the voltage dividing resistors 83, 84 is supplied to the sample/hold circuit 85 as an input signal, and an output signal of the sample/hold circuit is a lamp voltage detection signal which has been masked against the re-arc voltage.

As described above, in this example, a control signal can be-generated for the sampling and holding operation through the differentiation-based detection of the output signal from the DC-AC converter circuit 75. Since the width of the output from the differentiator circuit (or a time for which the differentiated signal is generated) reflects a time for which a re-arc voltage occurs, a masking time against the re-arc voltage can be advantageously set to a minimally required time. In contrast, in a method of generating a control signal for a sampling and holding operation from a timing generator circuit for driving a bridge, difficulties are encountered in a support to fluctuations in a re-arc voltage occurring time due to variations, individual differences and the like in a lamp current and the characteristics of an inductive element (the secondary winding of the starting transformer and the like) connected to a discharge lamp. In other words, this method must set a masking time (holding time) in anticipation of a maximum occurrence time of the re-arc voltage, so that a lamp voltage detection time (sampling time) is correspondingly reduced, thereby suffering from associated difficulties in ensuring a detection accuracy.

As described above, the mask signal against the re-arc voltage is preferably generated utilizing a signal which can be acquired at a detection position near a discharge lamp, so that the detection of a lamp voltage or a lamp current, or the detection of a voltage at an output stage of a DC-AC converter in a power system is preferable for an improvement on the reliability related to the timing of the mask signal (less susceptible to the aforementioned phase shift and timing shift even at higher lighting frequencies).

Other implementations are within the scope of the claims.

What is claimed is:

1. A lighting apparatus for a discharge lamp comprising:

a DC-AC converter circuit to receive a DC input voltage to convert the DC input voltage to an AC voltage, detecting means to detect a lamp voltage associated with the discharge lamp, or a lamp voltage and a lamp current associated with the discharge lamp, and a signal generator circuit to generate a mask signal, for excluding a re-arc voltage occurring upon polarity inversion from items to be detected, upon detection of the lamp voltage, wherein, during operation, said signal generator circuit detects a timing at which the polarity is inverted by detecting the lamp voltage or the lamp current or a voltage at an output stage of said DC-AC converter to generate the mask signal against the re-arc voltage.

2. The lighting apparatus for a discharge lamp according to claim 1 wherein said signal generator circuit comprises a differentiator circuit to detect the polarity inversion timing.

3. The lighting apparatus for a discharge lamp according to claim 1 wherein said signal generator circuit comprises a comparator circuit to compare a signal level with a predefined reference value, and a delay circuit arranged subsequent to said comparator circuit to detect the polarity inversion timing.

4. The lighting apparatus for a discharge lamp according to claim 1 arranged to generate the mask signal by detecting that a detected value of the lamp current is zero or equal to or lower than a reference value while the re-arc voltage is occurring, and to obtain a detection result of the lamp voltage by a logical AND operation of the mask signal with a detected signal of the lamp voltage.

* * * * *